United States Patent
Kouno et al.

(10) Patent No.: US 7,559,727 B2
(45) Date of Patent: Jul. 14, 2009

(54) TAPPING METHOD AND DEVICE, AND PUNCH PRESS

(75) Inventors: Shigeyoshi Kouno, Kanagawa (JP); Tadashi Yokoyama, Kanagawa (JP)

(73) Assignee: Amada Company Limited, Kanagawa (JP)

( * ) Notice: Subject to any disclaimer, the term of this patent is extended or adjusted under 35 U.S.C. 154(b) by 484 days.

(21) Appl. No.: 10/532,729

(22) PCT Filed: Oct. 28, 2003

(86) PCT No.: PCT/JP03/13778

§ 371 (c)(1),
(2), (4) Date: Apr. 27, 2005

(87) PCT Pub. No.: WO2004/037482

PCT Pub. Date: May 6, 2004

(65) Prior Publication Data

US 2005/0271485 A1 Dec. 8, 2005

(30) Foreign Application Priority Data

Oct. 28, 2002 (JP) ............................ 2002-312811
Feb. 18, 2003 (JP) ............................ 2003-039705

(51) Int. Cl.
*B23B 3/00* (2006.01)
(52) U.S. Cl. ...................................... 408/124; 408/141
(58) Field of Classification Search ................. 408/1 R, 408/8, 11, 56, 57, 87, 95, 101, 102, 126, 408/138, 141, 143, 124, 125, 129, 130; *B23G 1/00, B23G 1/16, 1/18, 1/20, 1/22, 1/46, 3/00, 5/00, B23G 5/06*

See application file for complete search history.

(56) References Cited

U.S. PATENT DOCUMENTS

| 2,314,138 | A | * | 3/1943 | Garbe et al. | ................. 408/68 |
| 4,761,100 | A | * | 8/1988 | Maillard | ..................... 408/1 R |
| 4,977,804 | A | * | 12/1990 | Naito | ........................ 83/76.7 |

(Continued)

FOREIGN PATENT DOCUMENTS

JP 04063622 A * 2/1992

(Continued)

OTHER PUBLICATIONS

English Language Abstract of JP 8-071848.

(Continued)

*Primary Examiner*—Daniel W Howell
(74) *Attorney, Agent, or Firm*—Greenblum & Bernstein, P.L.C.

(57) ABSTRACT

A tapping method includes engaging a front end of a tap with a prepared hole formed in a workpiece. The tap is provided at a tapping tool attached to a rotating mold indexing device that includes a control motor M. The rotating mold indexing device is rotatably provided at a punch press. The tapping method also includes rotating the control motor M positively to rotate the tap positively when the front end of the tap is engaged with the prepared hole. The tapping method also includes stopping positive rotation of the control motor M and rotating the motor reversely, thereby to detach the tap from the prepared hole of the workpiece, when it is detected that the control motor M has rotated a determined number of times or that a predetermined time has elapsed.

6 Claims, 10 Drawing Sheets

U.S. PATENT DOCUMENTS

| | | | | |
|---|---|---|---|---|
| 5,001,827 A | * | 3/1991 | Nakagawa | 29/560 |
| 5,016,335 A | | 5/1991 | Becker et al. | |
| 5,044,239 A | * | 9/1991 | Endo et al. | 83/133 |
| 5,259,100 A | * | 11/1993 | Takahashi | 29/33 J |
| 5,613,416 A | * | 3/1997 | Fujita | 83/98 |
| 5,615,471 A | * | 4/1997 | Perazzolo | 29/560 |
| 5,682,657 A | * | 11/1997 | Hirose | 29/33 J |
| 6,152,659 A | * | 11/2000 | Seki | 408/137 |

FOREIGN PATENT DOCUMENTS

| | | | | |
|---|---|---|---|---|
| JP | 04071731 A | * | 3/1992 | |
| JP | 05084527 A | * | 4/1993 | |
| JP | 05318248 A | * | 12/1993 | |
| JP | 7-185975 | | 7/1995 | |
| JP | 8-071848 | | 3/1996 | |
| JP | 9-047917 | | 2/1997 | |
| JP | 09076120 A | * | 3/1997 | |
| JP | 2541404 | | 4/1997 | |
| JP | 9-155638 | | 6/1997 | |
| JP | 11005127 A | * | 1/1999 | |
| JP | 2000-033520 | | 2/2000 | |
| JP | 2001-232518 | | 8/2001 | |
| JP | 2002066670 A | * | 3/2002 | |
| JP | 2002-103140 | | 4/2002 | |
| JP | 2003211239 A | * | 7/2003 | |
| JP | 2003266135 A | * | 9/2003 | |
| SU | 1286360 A1 | * | 1/1987 | |
| SU | 1430196 A1 | * | 10/1988 | |

OTHER PUBLICATIONS

English Language Abstract of JP 9-155638.
English Language Abstract of JP 2541404.
English Language Abstract of JP 7-185975.
English Language Abstract of JP 9-047917.
English Language Abstract of JP 2000-033520.
English Language Abstract of JP 2002-103140.
English Language Abstract of JP 2001-232518.

* cited by examiner

TAPPING METHOD AND DEVICE, AND PUNCH PRESS

TECHNICAL FIELD

The present invention relates to a tapping method of performing tapping process to a prepared hole formed in a plate-like work by a punch press such as a turret punch press, a tapping device and the punch press, more specifically, a method of performing tapping process by using a rotating mold indexing device provided in the punch press and a tapping device and a punch press capable of determining whether or not the tap is broken.

BACKGROUND ART

Conventionally, in a punch press such as a turret punch press, a technique of performing burring process or drilling process to a plate-like work and then performing tapping process to the part subjected to burring process or a prepared hole has been disclosed. The technique is disclosed in, for example, Japanese Patent Application Laid-Open No. 8-71848 (hereinafter referred to as "patent document 1") and Japanese Patent Application Laid-Open No. 9-155638 (hereinafter referred to as "patent document 2").

Further, the configuration in which tapping process is performed by attaching a tapping device to a rotating mold indexing device rotatably provided at the punch press has been developed. It is disclosed in, for example, Japanese Utility Model Registration Publication No. 2541404 (hereinafter referred to as "patent document 3") and Japanese Patent Application Laid-Open No. 7-185975 (hereinafter referred to as "patent document 4").

On the other hand, in a conventional tapping device, as a configuration of detecting whether or not a tap is broken, the configuration in which an operator activated by the tap passing through a work is provided at a tap die supporting the work in opposed to the tap and breakage of the tap is detected by detecting that this operator has been activated by a sensor such as a micro switch has been developed. It is disclosed in, for example, Japanese Patent Application Laid-Open No. 9-47197 (hereinafter referred to as "patent document 5").

According the invention described in the patent document 1, it is the configuration in which linear motion when a head member in a rotational tool device with a rotational tool such as tap and reamer is pressed and lowered by a vertically-movable ram (striker) provided at the punch press is converted into rotational motion, thereby to rotate the rotational tool.

The above-mentioned configuration has the following problems: conversion of linear motion into rotational motion makes the configuration complicated and a short length of vertical stroke of the ram requires increasing the number of the rotational tool, resulting in short lifetime of the tap.

According the invention described in the patent document 2, since a process position by the punch press greatly deviates from a tapping process position by the tapping device, when a prepared hole is processed in the vicinity of the end part of the work for tapping process, a work holding position by a work positioning device for positioning transfer position of the work needs to be changed and a motor for driving the tapping device or the like needs to be provided separately.

Accordingly, to improve processing efficiency and simplify the configuration, further improvement is desired.

According the invention described in the patent document 3, since the tapping tool is attached to the rotating mold indexing device provided at the punch press and the tapping tool is rotated by using the motor of the rotating mold indexing device, the above-mentioned problems in the cited references 1 and 2 can be solved. However, in this configuration, the tap is fed by providing a master screw and rotating speed of the tap is increased by using a planetary gear drive or the like, leading to the problem that the whole configuration becomes complicated.

According the invention described in the patent document 4, since the tapping tool is attached to the rotating mold indexing device provided at the punch press and the tap is rotated by using the motor of the rotating mold indexing device to perform tapping process, a head part has an engaging part with the ram and a speed increasing mechanism for increasing the rotational speed of the tap in the state where the ram is engaged with the engaging part is provided, resulting in more complicated configuration.

Further, in the patent document 5, by turning ON or OFF the micro switch as a sensor by operation of the operator provided at the tap die, breakage of the tap is detected and when the micro switch breaks down in the ON or OFF state, it is difficult to determine whether the ON or OFF state is caused by failure of the breakage of the tap or the micro switch.

In the patent document 5, there is a problem that the operator provided at the tap die is an obstacle when discharging chips generated during tapping process.

To solve the above-mentioned problems, a first object of the present invention is to provide a tapping method, a tapping device and a punch press which can readily perform tapping process by using the rotating mold indexing device provided at the punch press with simple configuration.

A second object of the present invention is to provide a tapping method, a tapping device and a punch press which can detect breakage of the tap and failure of the sensor for detecting the breakage.

Further, a third object of the present invention is to provide a tapping method, a tapping device and a punch press which can suck and discharge chips generated during tapping process.

DISCLOSURE OF THE INVENTION

In order to achieve the above objects, a tapping method for performing tapping process in a punch press according to a first aspect of the present invention comprises steps of: (a) engaging a front end of a tap provided at a tapping tool attached to a rotating mold indexing device rotatably provided at the punch press with a prepared hole formed in a work; (b) when the front end of the tap is engaged with the prepared hole, rotating a control motor of the rotating mold indexing device positively to rotate the tap positively; and (c) when it is detected that the control motor of the rotating mold indexing device has rotated a determined number of times, stopping positive rotation of the control motor and rotating the motor reversely, thereby to detach the tap from the prepared hole of the work.

A tapping method for performing tapping process in a punch press according to a second aspect of the present invention comprises steps of: (a) engaging a front end of a tap provided at a tapping tool attached to a rotating mold indexing device rotatably provided at the punch press with a prepared hole formed in a work; (b) when the front end of the tap is engaged with the prepared hole, rotating a control motor of the rotating mold indexing device positively to rotate the tap positively; and (c) when it is detected that predetermined time has elapsed since the control motor of the rotating mold indexing device started rotating, stopping positive rotation of the control motor and rotating the motor reversely, thereby to detach the tap from the prepared hole of the work.

A tapping device according to a third aspect of the invention comprises: a tap holder provided in a shank body which can be freely attached to a rotating mold indexing device rotatably provided at a punch press so as to be movable in the vertical direction, the tap holder having a tap at its lower end and being provided so as to be movable only in the vertical direction and urged upwards; and a downward movement transmitting means for transmitting downward motion of a ram provided at the punch press so as to be movable in the vertical direction to the tap holder, the downward movement transmitting means being at an upper part of the shank body.

A tapping device according to a fourth aspect of the invention comprises: a tap holder provided in a shank body which can be freely attached to a rotating mold indexing device rotatably provided at a punch press so as to be movable in the vertical direction, the tap holder having a tap at its lower end and being provided so as to be movable only in the vertical direction and urged upwards; and a downward movement transmitting means for transmitting downward motion of a ram provided at the punch press so as to be movable in the vertical direction to the tap holder; wherein the downward movement transmitting means has a pressing means for pressing the tap holder downwards by fluid pressure supplied from the ram and a shock absorbing means.

A tapping device according to a fifth aspect of the invention, is a tapping device as stated in the third or the fourth aspect, wherein a work brace is rotatably provided at a lower end of the shank body.

A tapping device according to a sixth aspect of the invention, is a tapping device as stated in the third, the fourth or the fifth aspect, wherein an oil channel for guiding oil supplied from the ram to the tap is provided in the downward movement transmitting means and the tap holder.

A tapping device according to a seventh aspect of the invention, is a tapping device as stated in the third, the fourth, the fifth or the sixth aspect, wherein an elastic member which can freely transmit downward motion of the ram is provided at the downward movement transmitting means to lower the tap holder against upward energizing force of the tap holder.

A punch press according to a eighth aspect of the invention, is a punch press with a rotating mold indexing device for performing rotation indexing of a rotating mold comprising: a control motor for driving rotation of the rotating mold indexing device; and a motor control means which can freely control the control motor in response to rotation indexing of the rotating mold and tapping process by a tapping tool attached to rotating mold indexing device.

A punch press according to a ninth aspect of the invention is a punch press as stated in the eighth aspect, wherein the motor control means has a rotation direction switch means for stopping positive rotation of the control motor and switching to reverse rotation when it is detected that the control motor has rotated a predetermined number of times or that predetermined time has elapsed since start of positive rotation.

A tapping device according to a tenth aspect of the invention comprises: a tap die for supporting a work as opposed to a tap for performing tapping process with respect to a prepared hole formed in the work; an operator which is provided at the tap die and activated by the tap passing through the work; a sensor for detecting that the operator has been activated; and a sensor monitoring means for monitoring the state of the sensor.

A tapping device according to a eleventh aspect of the invention comprises: a tap die for supporting a work as opposed to a tap for performing tapping process with respect to a prepared hole formed in the work; an operator which is provided at the tap die and activated by the tap passing through the work; and an air exhaust hole for ejecting air into a discharge hole in the operator at activation of the operator.

A tapping device according to a twelfth aspect of the invention is a tapping device as stated in the eleventh aspect, wherein the air exhaust hole is directed to the discharging direction of the discharge hole.

As understood from the description described above, according to the present invention, tapping processing can be easily performed with simple configuration by using the motor of the rotating mold indexing device provided at the punch press and therefore, the above-mentioned conventional problems can be solved.

Further, according to the present invention, it is possible to detect failure of the sensor for detecting breakage of the tap as well as breakage of the tap and suck and discharge chips generated during tapping process, and therefore, the above-mentioned conventional problems can be solved.

BEST MODE FOR CARRYING OUT THE INVENTION

Embodiments of a tapping method, a tapping device and a punch press of the present invention will be described in detail with reference to figures.

Figure 1:
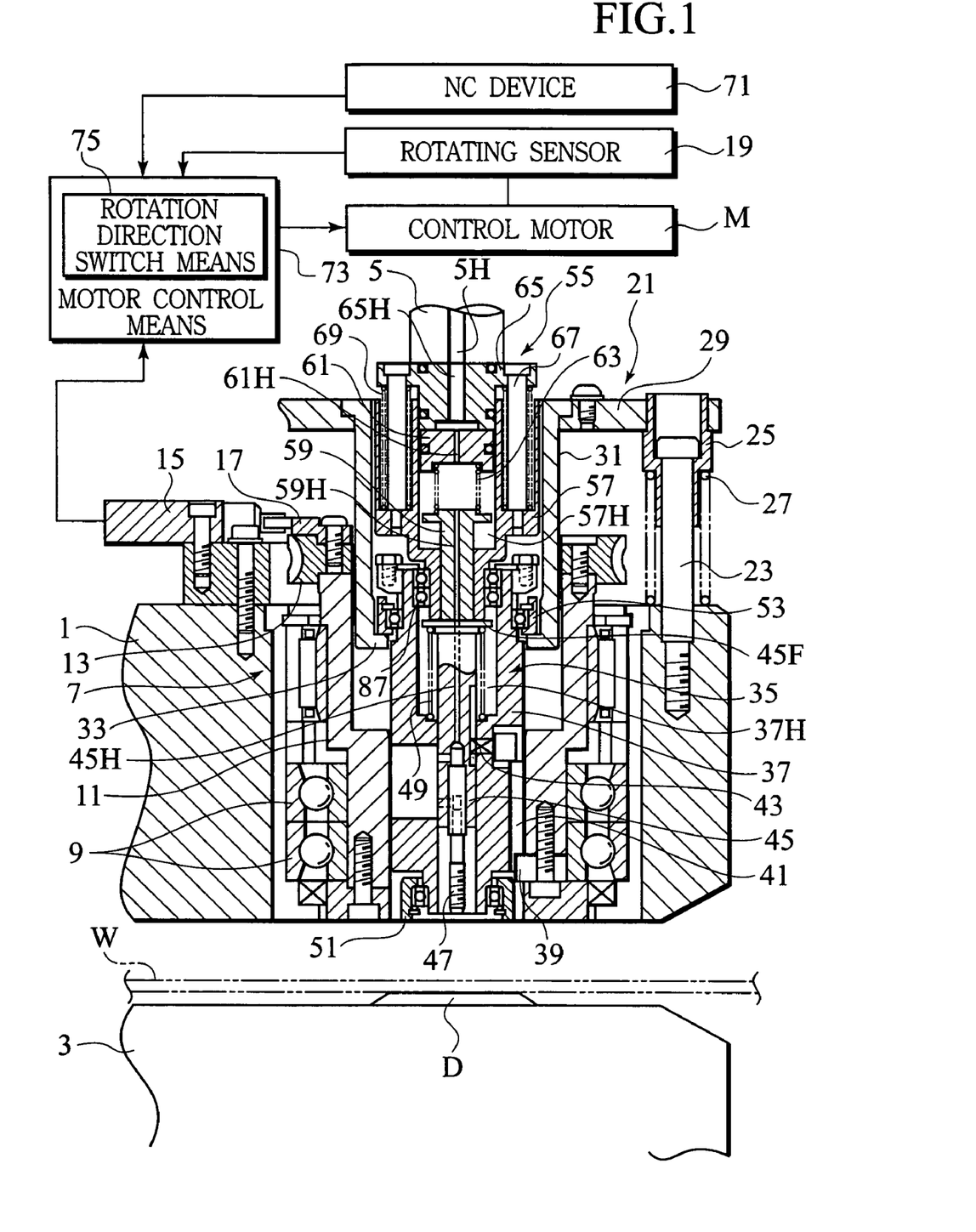
FIG. 1 is a sectional view illustrating functions of a punch press and a tapping tool in accordance with an embodiment of the present invention.

Referring to FIG. 1, the punch press of this embodiment has an upper holder 1 and a lower holder which correspond to an upper turret and a lower turret in a turret punch press and a ram (striker) 5 which can move freely in the vertical direction and adjust its vertical position. Since this type of punch press is publicly known, detailed description of whole configuration of the punch press is omitted.

To the upper holder 1 is attached a rotating mold indexing device 7 for performing indexing of orientation of an upper mold (not shown) which adds a process with orientation, for example a long hole, to a plate-like work W. The rotating mold indexing device 7 has a cylindrical rotating sleeve 11 rotatably supported by the upper holder through a plurality of bearings 9 and an annular worm wheel 13 is fixed integrally with an upper part of the rotating sleeve 11.

The worm wheel 13 is engaged with a worm gear (not shown) rotated by a reciprocally-rotatable control motor M. A dog 17 for activating an origin sensor 15 such as a limit switch provided at an appropriate position of the upper holder 1 is attached to the worm wheel 13. Alternatively, a timing pulley and a timing belt in place of the worm wheel and the worm gear may be used and the timing pulley may be rotated by the control motor.

Accordingly, when the worm wheel 13 is rotated by the control motor M and the origin sensor 15 is activated by the dog 17, it can be detected that the upper mold attached to the rotating sleeve 11 is located at an origin in the rotation direction. Alternatively, the origin can be detected by using a motor with absolute encoder without a component such as the origin sensor. Rotational position of the upper mold from the origin can be detected by detecting rotation of the control motor M with a rotating sensor 19 such as a rotary encoder.

A mold holder 21 is disposed above the rotating mold indexing device 7 so as to be movable in the vertical direction. More specifically, guide pins 23 vertically arranged at plural places on an upper face of the upper holder 1 are supported by sliders 25 so as to be movable in the vertical direction and lifter springs 27 for urging the sliders 25 upwards at all time are elastically installed between the sliders 25 and the upper holder 1.

The plural sliders 25 are connected with each other in one unit by a lifter plate 29 and a cylindrical holder sleeve 31 is attached to the lifter plate 29 at a position corresponding to the rotating sleeve 11. The holder sleeve 31 serves to detachably support the upper mold attached to the rotating mold indexing device 7, a lower end of the holder sleeve 31 is fitted into the rotating sleeve 11 from above so as to be movable in the vertical direction and an annular projecting part 33 for supporting the upper mold is provided at the lower end of the holder sleeve 31.

A tapping tool 35 (tapping device) used by being attached to the rotating mold indexing device 7 with the above-mentioned configuration has a cylindrical shank body 37 fitted into the rotating sleeve 11 so as to be movable in the vertical direction. A vertical key groove 41 engaging with a key 39 provided at a lower part on an inner peripheral face of the rotating sleeve 11 is formed on an outer peripheral face of the shank body 37.

A tap holder 45, rotation of which is controlled by a key 43 of the shank body 37 is provided in the shank body 37 so as to be movable in the vertical direction and a tap 47 is detachably attached to a lower part of the tap holder 45 so as to protrude downwards. An upper part of the tap holder 45 protrudes into a large diameter hole 37H provided at the shank body 37 and an elastic member 49 such as a coil spring for urging the tap holder 45 upwards at all time is elastically installed between a bottom part of the large diameter hole 37H and the upper end of the tap holder 45.

A vertical through hole 45H communicating to a tap attachment hole to which the tap 47 is attached is provided at the tap holder 45 as an oil channel. Oil flowing into the through hole 45H reaches a front end of the tap 47 through a vertical minute groove (not shown) formed on a hole into which a shank of the tap 47 is inserted.

A cylindrical work brace 51 which protrudes up to a lower position than the front end (lower end) of the tap 47 in normal state is rotatably attached to the lower end of the shank body 37 through a bearing. An engaging ring 53 which can engage with the inner projecting part 33 of the holder sleeve 31 from above is relatively rotatably attached to an outer peripheral face of the upper end of the shank body 37 through a bearing.

A downward movement transmitting means 55 for transmitting downward movement of the ram 5 to the tap holder 45 is provided at the upper part of the shank body 37. More specifically, a cylindrical head holder 57 is relatively rotatably supported by the upper part of the shank body 37 through a bearing and a pressing rod 59, a lower end face of which abuts on an upper end face of the tap holder 45 in the normal state, is provided in a vertical large diameter hole 57H formed in the head holder 57 so as to be movable in the vertical direction. A vertical through hole 59H communicatable with the through hole 45H of the tap holder 45 is formed in the pressing rod 59 as oil channels.

In the large diameter hole 57H of the head holder 57, a piston 61 having a vertical through hole 61H as an oil channel in its axis part above the pressing rod 59 is fitted so as to be movable in the vertical direction and as an example of an elastic means that can freely transmit downward movement of the piston 61 to the tap holder 45 through the pressing rod 59, an elastic member 63 such as a coil spring and a rubber body is elastically installed between the piston 61 and the pressing rod 59. The spring constant of the elastic member 63 is set to be smaller than the spring constant of the elastic member 49 urging the tap holder 45 upwards and the elastic member 63 constitutes a shock absorbing means for absorbing shock when a front end of the tap 47 is engaged with a prepared hole of a work W.

A head member 65 that can freely press down the piston 61 is engaged with the upper part of the large diameter hole 57H of the head holder 57 so as to be movable in the vertical direction. The head member 65 is controlled in terms of upward movement and vertically movably supported by a plurality of guide pins 67 vertically installed at the head holder 57, and urged upwards at all time by a plate-holding elastic member 69 such as a coil spring elastically installed between the head member 65 and the head holder 57. A vertical large diameter hole 65H which can be connected to an oil mist exhaust nozzle 5H provided at the ram 5 as well as a small diameter through hole 61H provided at the piston 61 is formed in the axis part of the head member 65 as an oil mist channel.

With the above-mentioned configuration, as in general punch presses, overall operation of the punch press is performed by control of an NC device 71 and the control motor M of the rotating mold indexing device 7 is controlled by a motor control means 73 with a rotation direction switch means 75. That is, when a general upper mold is attached to the rotating mold indexing device 7, rotation the control motor M is controlled intermittently to perform rotation indexing of the upper mold. When the tapping tool 35 is attached to the rotating mold indexing device 7, the control motor M is controlled so as to continuously rotate positively at high-speed rotation suitable for cutting conditions of the tap 47 provided at the tapping tool 35 and rotate reversely at the termination of tapping process.

With the above-mentioned configuration, when a general upper mold is attached to the rotating mold indexing device 7, after the rotating mold indexing device 7 is positioned relatively at a position below the ram 5, according to a command from the NC device 71, the motor control means 73 performs rotation control of rotating the control motor M intermittently to position the upper mold at a desired angle.

When the tapping tool 35 is attached to the rotating mold indexing device 7, after the rotating mold indexing device 7 is positioned relatively at a position below the ram 5, tapping process is carried out in a prepared hole previously formed on the work W by the tap 47 provided in the tapping tool 35.

As shown in FIG. 1, the dog 17 provided at the rotating mold indexing device 7 activates the origin sensor 15 and the rotating sleeve 11, the worm wheel 13 and the like is located at the origin in the rotation direction, and the ram 5 in the punch press descends to abut on the head member 65 (the state shown in FIG. 1). After that, when the ram 5 further descends, the tapping tool and the holder sleeve descend.

At this time, since the lifter spring 27 is a relatively weak spring, the holder sleeve 31 and the tapping tool 35 are lowered against energizing force of the lifter spring 27.

As described above, when the holder sleeve 31 and the tapping tool 35 descend, the work brace 51 provided at the lower end of the shank body 37 abuts on an upper face of the work W. Further, when the ram 5 descend slightly, the work brace 51 presses the work W onto a die D provided on the lower holder 3 for fixation by energizing force of the elastic member 69.

Therefore, tapping process can be carried out stably without transferring the work W during tapping process by the tap 47.

As described above, in the state where the work brace 51 presses the work W onto the die D, when descending of the ram 5 is stopped and oil mist is ejected from the high-diameter oil mist exhaust nozzle 5H provided at the ram 5, oil falls from the vertical through hole 61H of the piston 61 and however, fluid pressure between the head member 65 and the piston 61 is gradually increased, thereby to lower the piston 61 gradually. Accordingly, the piston 61 as a pressing means for pressing the tap holder 45 downwards presses the tap holder 45 downwards against energizing force of the elastic member 49 through the elastic member 63 and the pressing rod 59. Thus, the front end (lower end) of the tap 47 provided at the lower end of the tap holder 45 is engaged with the prepared hole previously formed in the work W.

As described above, when the front end of the tap 47 is engaged with the prepared hole in the work W, the control motor M is positively rotated at high speed under control of the motor control means 73, thereby to rotate the tap 47 positively.

As the operation of engaging the tap 47 with the prepared hole of the work W, the following operation is possible in place of the operation of ejecting oil mist from the oil mist exhaust nozzle 5H of the ram 5. That is, in the state where the work brace 51 presses and fixes the work W as described above, when the ram 5 descends, thereby to lower the head member 65, the elastic member 63 is further compressed through the piston 61, and the tap holder 45 is lowered against energizing force of the elastic member 49 by the elastic member 63 and the pressing rod 59.

Subsequently, when the front end of the tap 47 provided at the tap holder 45 is engaged with the prepared hole previously formed in the work W, descending of the ram 5 is stopped, positive rotation of the control motor M is started by the motor control means 73 and the tap 47 is positively rotated at high speed with the number of rotations suitable for cutting conditions.

Whether or not the front end of the tap 47 is engaged with the prepared hole of the work W can be detected appropriately by detecting load change in an actuator for lowering the ram 5, detecting passage of preset time since descending of the ram 5, or the like. When the front end of the tap 47 is engaged with the prepared hole of the work W, the elastic member 63 functions as a shock absorbing means for absorbing shock and prevents the tap 47 from breakage during the above-mentioned engagement.

As described above, in the state where the front end of the tap 47 is engaged with the prepared hole in the work W, when the control motor M is positively rotated at high speed and the tap 47 is positively rotated at a rotational speed suitable for tapping process, the tap 47 digs into the prepared hole in the work W and is propelled to descend actively while performing tapping process.

At this time, oil mist ejected from the oil mist exhaust nozzle 5H of the ram 5 falls to the tap 47 through the through holes as oil channels formed in the head member 65, the piston 61, the pressing rod 59 and the tap holder 45 so as to cool the tap 47 and is led by sliding parts of the head member 65, the piston 61, the pressing rod 59 and the tap holder 45 to serve the lubricating function. As a result, in the tap 47, life can be extended and each sliding part can be operated more smoothly.

When the tap 47 is rotated positively and tapping process is started, the origin sensor 15 is activated by the dog 17 at each rotation of the tap 47. Thus, by counting an actuating signal of the origin sensor 15 in the motor control means 73 and detecting rotation of the control motor M by the rotating sensor 19 since the actuating signal of the origin sensor 15 is input, the amount of ingress of the tap 47 with respect to the prepared hole of the work W can be detected. Even with the configuration in which the number of rotations of the control motor M since start of rotation of the control motor M is detected by the rotating sensor 19, the number of rotations of the tap 47 can be detected.

Further, by detecting that a predetermined time has elapsed since positive rotation of the control motor M is stated, the number of rotations of the tap 47 can be roughly detected.

Accordingly, when the rotation direction switch means 75 provided in the motor control means 73 detects (determines) whether or not the control motor M has positively rotated a predetermined number of times or predetermined time has elapsed since start of positive rotation and on the basis of the determination, positive rotation of the control motor M is stopped and rotation direction is reversed, the tap 47 retreats and draws out from the prepared hole of the work W.

By raising and returning the ram 5 to the original position after the tap 47 draws out from the prepared hole of the work W, components such as the holder sleeve 31, the shank body 37 and the head member 65 returns to an initial state. Ejection of oil mist from the oil mist exhaust nozzle 5H of the ram 5 is stopped at stoppage of positive rotation of the tap 47 under control of the NC device 71.

As understood from the above-mentioned description, in this embodiment, since the control motor M for rotating the rotating mold indexing device of the punch press can freely carry out control in normal rotating mold indexing and control in tapping process by the motor control means 73, tapping process using the rotating mold indexing device can be performed easily.

Since tapping process is started by rotating the tap 47 positively in the state where the front end of the tap 47 is engaged with the prepared hole of the work W, the tap 47 starts to be intruded into the prepared hole of the work W concurrently with start of positive rotation of the tap 47 and therefore, control of the number of screw heads with respect to the prepared hole, that is, control of the amount of intrusion of the tap 47 with respect to the prepared hole can be easily performed.

Since the tapping tool 35 is detachable from the rotating mold indexing device 7, the general upper mold can be freely replaced with the tapping tool and the rotating mold indexing device 7 can be utilized effectively.

Further, since the motor control means 73 comprises the rotation direction switch means 75 for stopping positive rotation of the control motor M and switching to reverse rotation during tapping process, tapping process with respect to the prepared hole of the work W can be performed properly.

Next, with reference to FIG. 2, another embodiment of the tapping tool of the present invention will be described. Concerning the same components as those in the tapping tool 35 described with reference to FIG. 1, 100 are added to reference numerals in FIG. 1 and the added reference numerals are given in FIG. 2. Due to duplication, description of the same configuration is not repeated and configuration based on difference between them will be described.

In the tapping tool 35, the head holder 57 and the shank body 37 are rotatably connected with each other by the bearing 87. On the other hand, in a tapping tool 100 shown in FIG. 2, a head holder 157 and a shank body 137 are connected and fixed by a screw part 187. Accordingly, the head holder 157 and the shank body 137 are formed and rotated in one unit.

On the other hand, head members 165, 165a, and 165b are formed and fixed in one unit and engaged with a cylinder part of the head holder 157 slidably in the vertical direction. Accordingly, the head members 165, 165a, and 165b also rotate integrally with the head holder 157 and the shank body 137.

Further, a non-rotating head 181 is provided at the head members 165, 165a, and 165b via a thrust bearing 179. Here, the non-rotating head 181 is rotatable with respect to the head members 165, 165a, and 165b by the thrust bearing 179. In other words, even when the head holder 157, the shank body 137, and the head members 165, 165a, and 165b rotate, the non-rotating head 181 remains stationary without rotating with the striker 5.

Like the above-mentioned tapping tool 35, a through hole 165H is formed at the non-rotating head 181 and the head member 165.

Next, as described above, although the through hole 61H is formed in the piston 61 of the tapping tool 35, no through hole is formed in a piston 161 of the tapping tool 100 of this embodiment. In this case, compressed oil mist flowing through the through hole 165H presses down the piston 161 and passes through a gap between the periphery of the piston 161 and an inner wall of the head holder 157. For this reason, to facilitate the oil mist to pass through the gap, no O ring (O-shaped rubber packing) provided at the piston 61 of the tapping tool 35 is formed on the periphery of the piston 161.

With the above-mentioned configuration, when the tapping tool 100 inserted into the rotating sleeve 11 and the holder sleeve 31 shown in FIG. 1 is lowered by the striker 5 and the lower end abuts on the work W, the shank body 137, the head holder 157, and the head members 165, 165a, and 165b rotate together through the key 39 inserted into and engaged with a key groove 141a by the rotating sleeve 11. However, the non-rotating head 181, a work brace 151 and an engagement ring 153 remain stationary without rotating. Since vertical operation of the tapping tool 100 is same as that of the tapping tool 35, description thereof is not repeated.

In the tapping tool 100 of this embodiment, when the operator inserts the tapping tool 100 into the rotating sleeve 11 and the holder sleeve 31 shown in FIG. 1, even if the operator operates holding the head holder 157, the shank body 137 does not rotate. Thus, since a key groove 141 can be aligned with the key 39 when insertion, assembling operation is made more efficient.

Figure 2:
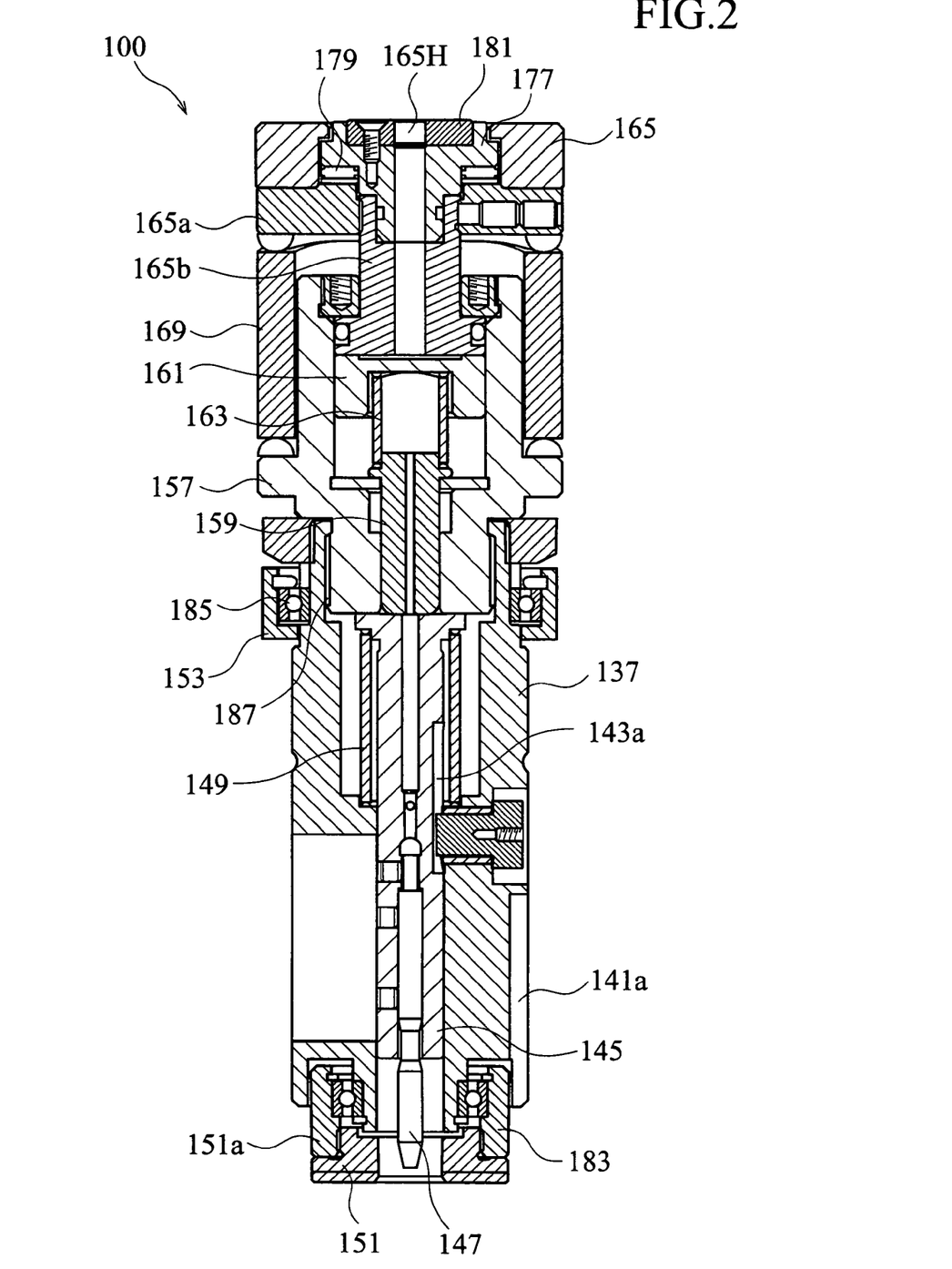
FIG. 2 is a sectional view of a partially-improved configuration of the tapping tool in accordance with an embodiment of the present invention.

Although a reference numeral 163 of the above-mentioned embodiment shown in FIG. 2 refers to a coil spring as in the embodiment shown in FIG. 1, the same effect can be achieved even when the coil spring is replaced with a cylindrical pipe member.

Next, with reference to a figure, a tapping process device (tapping device) of the embodiment of the present invention will be described.

Figure 3:
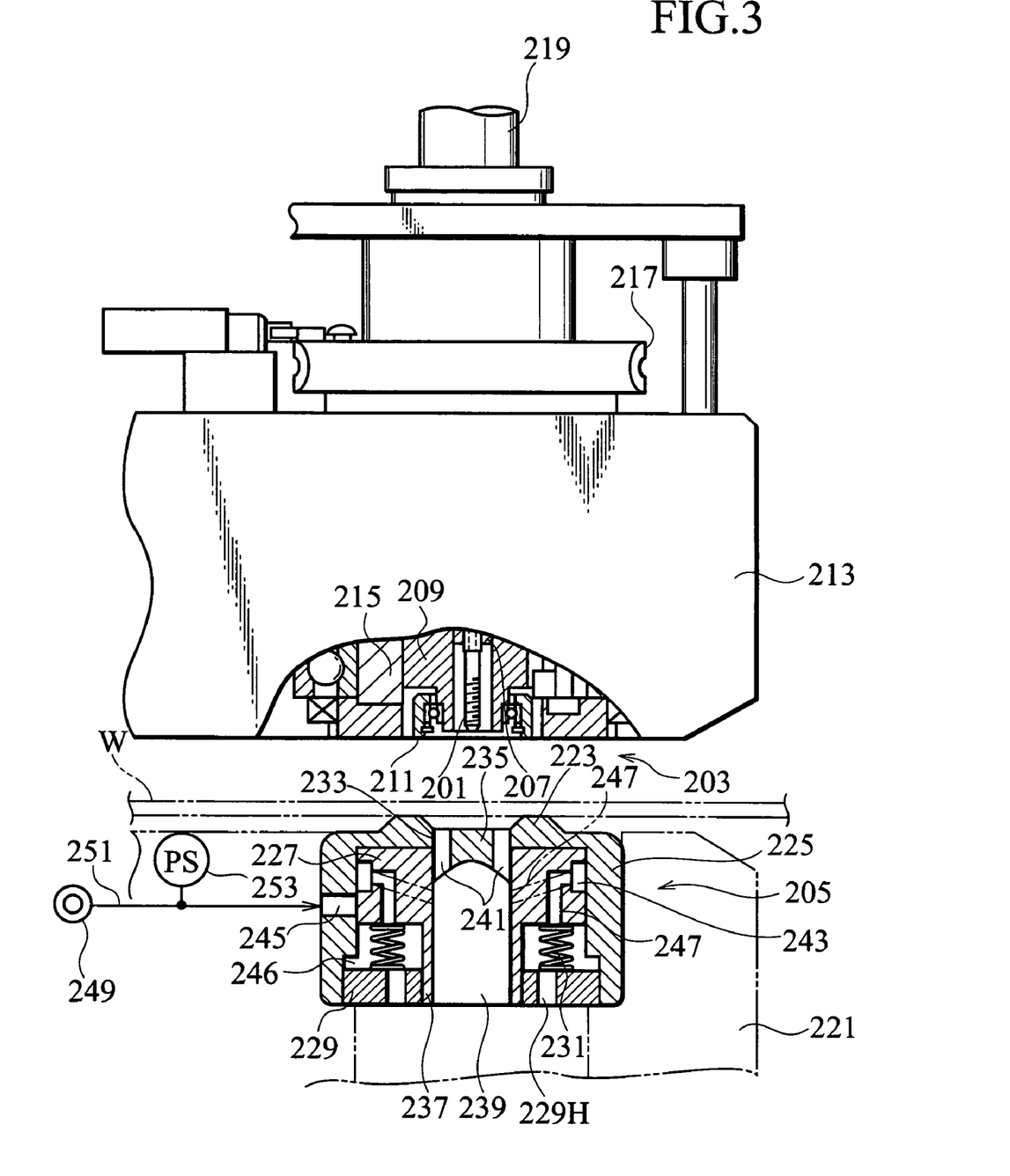
FIG. 3 is an explanatory view showing a tapping processing device in accordance with an embodiment of the present invention schematically and conceptually.

Referring to FIG. 3, the tapping process device of the embodiment of the present invention has a tapping unit 203 with a tap 201 for performing tapping process with respect to the prepared hole in the work W and a tap die 205 (tapping device) for supporting the work W in opposed to the tap 201.

The tapping unit 203 has a cylindrical shank body 209 which built a tap holder 207 holding the tap 201, which is capable of moving only in the vertical direction therein, and a cylindrical work brace 211 that can freely press the work W onto the tap die 205 is rotatably provided at a front end (lower end in FIG. 3) of the shank body 209.

The shank body 209 in the tapping unit 203 is supported by a cylindrical rotating body 215 rotatably provided at an upper holder 213 such as an upper turret in a turret punch press, for example, so as to be movable in the vertical direction and rotate integrally with the rotating body 215. To rotate the rotating body 215, a rotating transmission means 217 like an worm wheel is provided above the rotating body 215 and the rotating transmission means 217 is engaged with a worm (not shown) rotated by a tap rotating motor (not shown in FIG. 3) comprised of a servo motor. That is, the rotating body 215 is rotated positively and reversely by a tap rotating motor.

To vertically move the shank body 209 and the tap 201 with respect to the rotating body 215, a tap transferring actuator (not shown in FIG. 3) is provided. In the case where the tapping unit 203 is attached to the punch press, for example, the tap transferring actuator corresponds to an oil hydraulic cylinder, for example, for vertically transferring a ram (striker) 219 in the punch press.

With the above-mentioned configuration, when the rotating body 215 is rotated by the tap rotating motor and the tap transferring actuator is actuated, thereby to transfer the shank body 209 toward the tap die 205 (downward direction in FIG. 3), the tap 201 installed at the shank body 209 rotates integrally with the rotating body 215 and the shank body 209 and moves together in the same direction.

When the work brace 211 provided at the front end of the shank body 209 presses the work W onto the tap die 205, thereby to stop movement of the shank body 209, the tap 201 moves with respect to the shank body 209 and the front end of the tap 201 intrudes into the prepared hole of the work to perform tapping process of the prepared hole. Since the configuration of moving the tap 201 with respect to the shank body 209 may employ a publicly-known configuration, detailed description thereof is omitted.

As described above, when the tap rotating motor is rotated reversely to rotate the tap 201 reversely following tapping process of the prepared hole of the work W, the tap 201 moves so as to depart from the prepared hole of the work W and returns to an initial state by bringing back the shank body 209 to the original position.

The tap die 205 is attached to a lower holder 221 like a lower turret in the turret punch press so as to be opposed to the tapping unit 203. The tap die 205 has an outer cylinder 225 with a ring-like protruded work supporting part 223 for supporting the work W so as to be opposed to the work brace 211 and an operator 227 pressed and operated by the front end of the tap 201 passing through the work W is movably provided in the outer cylinder 225.

More specifically, the operator 227 is formed like a piston fitted into the outer cylinder 225 so as to be movable in the vertical direction and urged to the side of the work supporting part 223 at all time by an energizing means consisting of an elastic member 231 such as a spring elastically installed between a cover member 229 attached to the outer cylinder 225 and the operator 227.

A projecting part 235 which can be freely fitted into a through hole 233 formed in the center of the work supporting part 223 is provided on an end face of the operator 227 on the side of the work supporting part 223 and a cylindrical part 237 slidably passing through the cover member 229 is provided on an end face opposite to the end face on the side of the work supporting part 223. Communicating paths 241 which communicates a discharge hole 239 like a hole, a groove or the like for discharging chips and the like generated during tapping process to the end face on the side of the projecting part 235 are formed at plural places of the projecting part 235.

A circumferential groove 243 that communicates with an air port 245 formed in the outer sleeve 225 when being pressed and lowered by the tap 201 passing through the work W is formed on a circumferential face, and communicated with a communicating hole 247 (air exhaust hole 247) communicating with a space 246 in which the elastic member 231 is disposed. The space 46 communicates with the outside through a hole 229H formed in the cover member 229.

The air port 245 is connected with a pressure source 249 and a pressure sensor 253 as an example of a sensor for detecting whether or not the circumferential groove 243 is connected with the air port 245 is provided at a connecting path 251 connecting the air port 245 to the pressure source 249. In the configuration in which the air port 245 of the outer sleeve 225 is connected with the connecting path 251, it is preferred to provide a circumferential groove on the circumferential face of the outer sleeve 225, corresponding to the connecting path 251.

Figure 4:
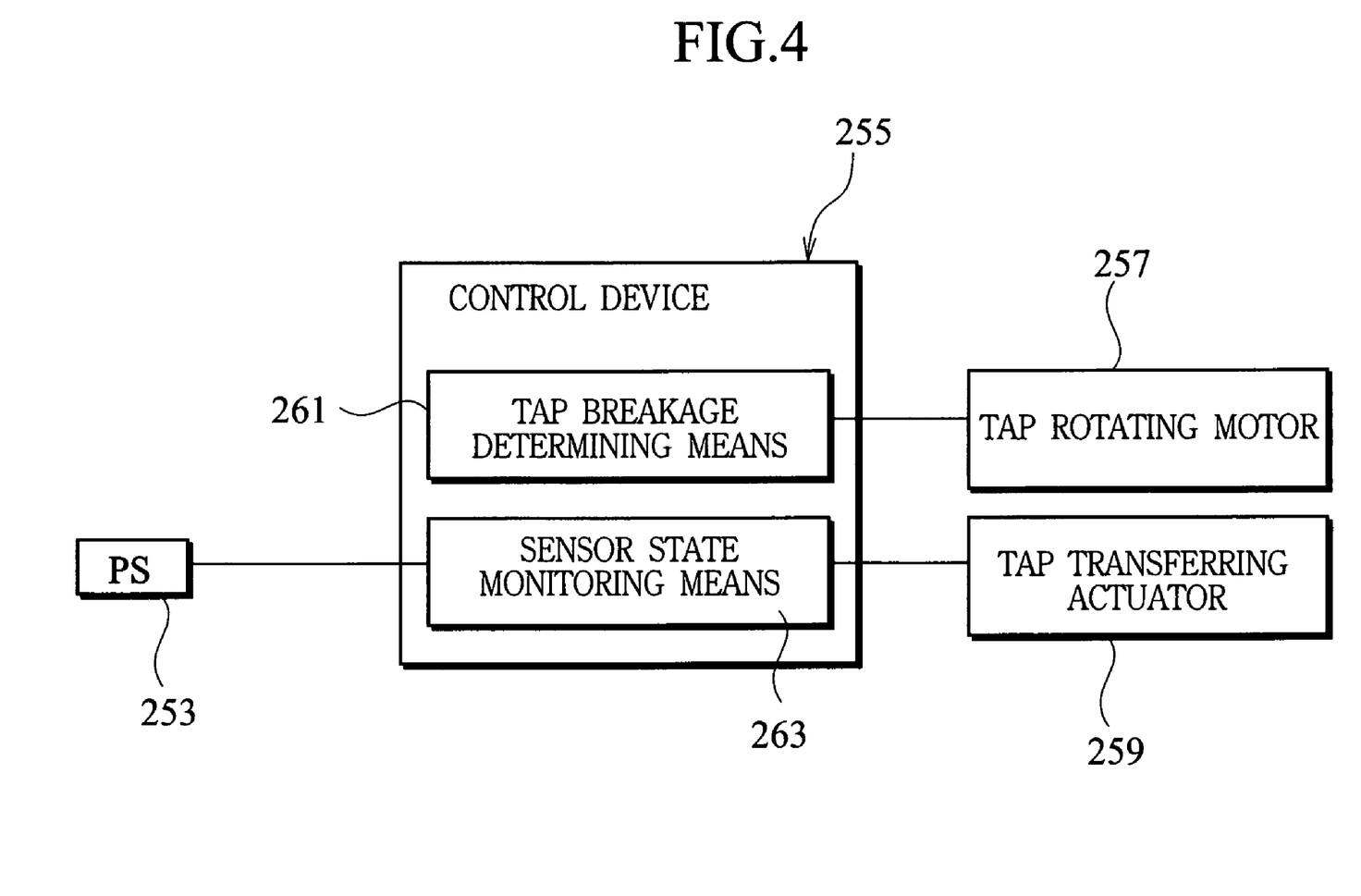
FIG. 4 is a block diagram showing a configuration of a main part in a control device of the tapping processing device.

As shown in FIG. 4, to a control device 255 for controlling the tapping processing device as mentioned above, the pressure sensor 253 and a tap transferring actuator 259 for vertically transferring a tap rotating motor 257 and the tapping unit 203 (in the case of the configuration of vertically transferring the tapping unit by using the ram of the punch press, it corresponds to an actuator for vertically transferring the ram) are connected.

The control device 255 has a tap breakage determining means 261 for determining breakage of the tap 201 and a sensor state monitoring means 263 for monitoring the state of the pressure sensor 253 on the basis of an input signal sent from the pressure sensor 253.

Figure 5:
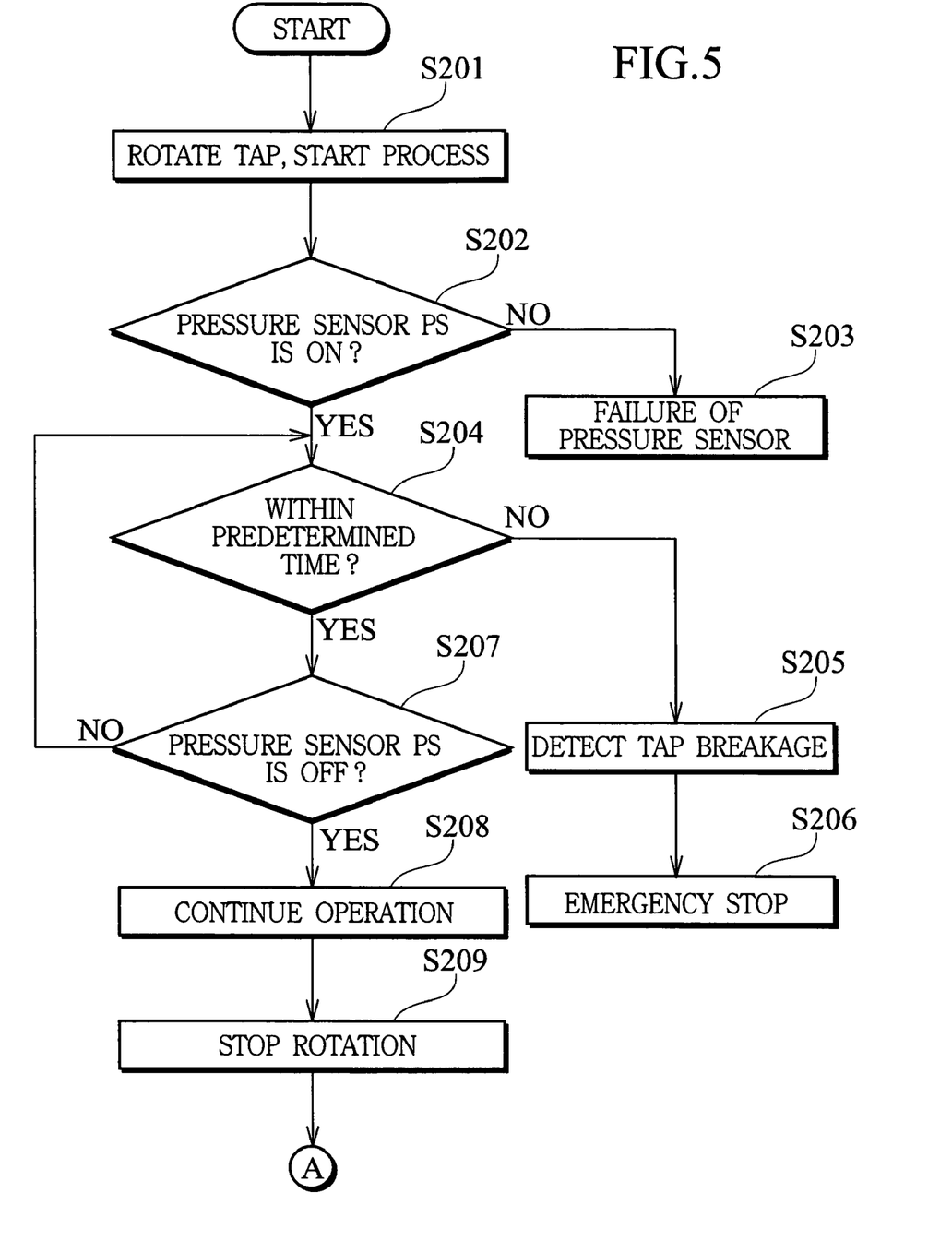
FIG. 5 is a flow chart showing an operation of detecting breakage of a tap.

With the above-mentioned configuration, when the tap rotating motor 257 is rotated positively, thereby to rotate the tap 201 positively and the tap transferring actuator 259 is activated, thereby to start transfer of the tapping unit 203 toward the tap holder 207 (start of tapping process) under control of the control device 255 (step S201), the sensor state monitoring means 263 monitors the state of the pressure sensor 253 (step S202).

In an initial state where tapping process is started, the operator 227 is pressed up by operation of the elastic member 231, the circumferential groove 243 of the operator 227 is not connected with the air port 245 provided at the outer sleeve 225, pressure within the connecting path 251 maintains to be high and the pressure sensor 253 remains in the ON state. Therefore, when the pressure sensor 253 is in the OFF state in the initial state, failure of the pressure sensor 253 can be detected (step S203).

Further, by monitoring the pressure sensor 253, failure of an air feeding system, for example, can be detected. Failure on whether or not the operator 227 in the tip die 205 returns to the normal position can be also detected. Therefore, since improper state of the pressure sensor 253, the air feeding system or the tip die 205 can be found by monitoring the state of the pressure sensor 253 in the step 3, trouble during process can be prevented from occurring.

As mentioned above, when the tap 201 is rotated positively to start tapping process, as mentioned above, the work brace 211 presses and fixes the work W onto the work supporting part 223 and then tapping process is performed with respect to the prepared hole of the work W. The tap breakage determining means 261 determines whether or not the state of the pressure sensor 253 changes (change of a detected value) within predetermined time since the tapping process is started (step S204) and in the case where the detected value of the pressure sensor 253 does not change within the predetermined time, detects breakage of the tap 201 (step S205) and makes emergency stop (step S206).

That is, when there is breakage in the tap 201, the tap 201 does not intrude into the prepared hole of the work W nor pass through the work W to press onto the operator 227. Accordingly, the circumferential groove 243 of the operator 227 is not connected with the air port 245 of the outer sleeve 225, pressure within the connecting path 251 maintains to be high and the pressure switch 253 (pressure sensor 253) remains in the ON state. Similarly, the case where the operator 227 does not operate normally due to abnormal wear of a contact part of the tap 201 and the operator 227 or the like can be detected.

When there is no breakage in the tap 201, the tap 201 intrudes into the prepared hole of the work W, passes through the work W to abut on the projecting part 235 of the operator 227 and presses down the operator 227 against energizing force of the elastic member 231. When the operator 227 is pressed down and the circumferential groove 243 of the operator 227 communicates with the air port 245 of the outer sleeve 225, air in the connecting path 251 flows into the circumferential groove 243 and pressure in the connecting path 251 is decreased. Thus, the pressure sensor 253 is brought into the OFF state.

Therefore, when it is detected that the state of the pressure sensor 253 has changed within the predetermined time (step S207), it is determined as normal and operation is continued (step S208). When tapping process of the prepared hole of the work W is carried out by lowering the tap 201, rotation of the tap 201 is stopped (step S209).

Figure 6:
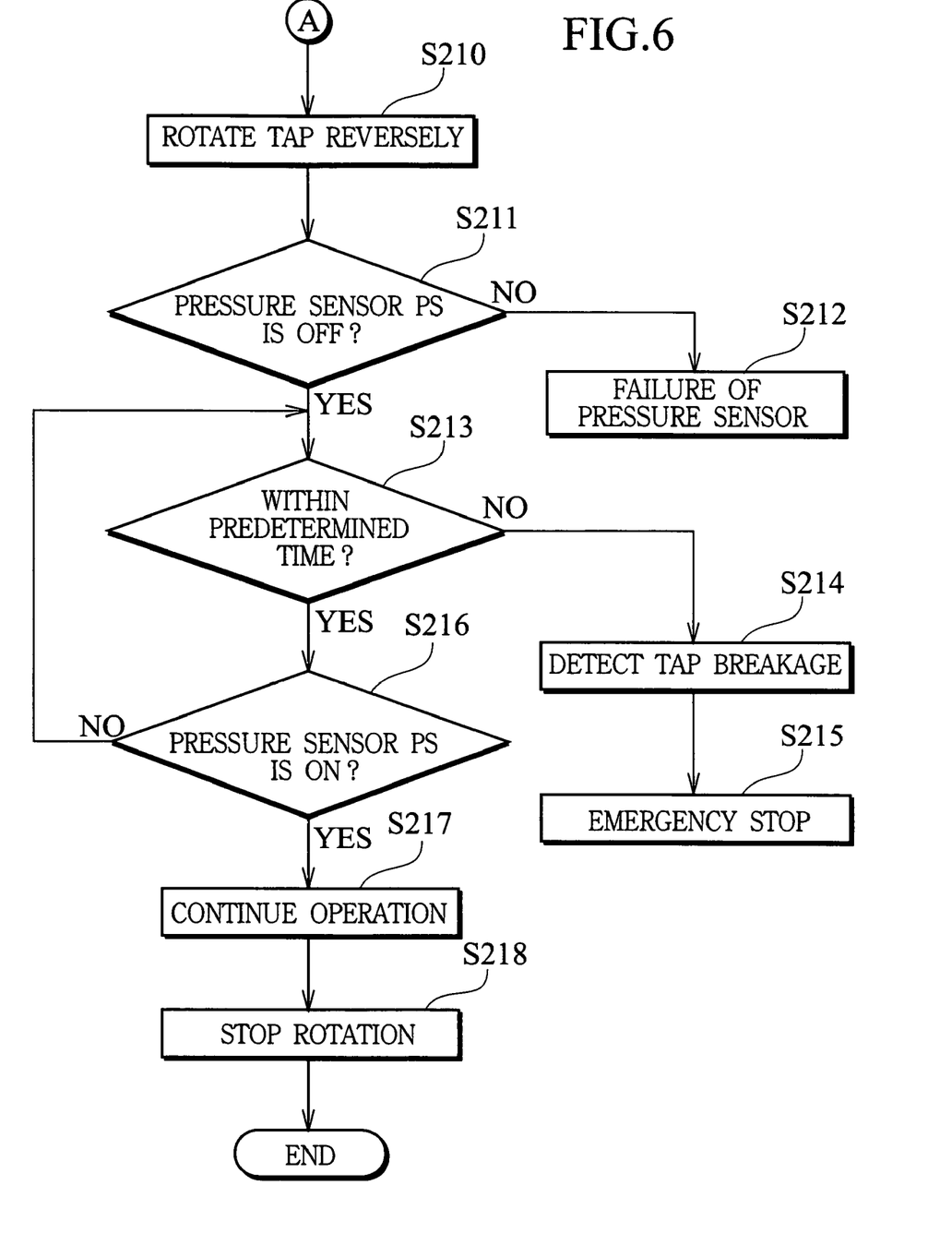
FIG. 6 is a flow chart showing an operation of detecting breakage of the tap.

Subsequently, the tap rotating motor 257 is rotated reversely, thereby to rotate the tap 201 reversely (step S210). In the state where the tap 201 starts to be rotated reversely, it is determined whether or not the pressure sensor 253 is in the OFF state (step S211) and if not, failure of the pressure sensor is detected (step S212). Similarly, faulty behavior that the operator 227 does not return to the original position can be detected.

It is determined whether or not the state of the pressure sensor 253 has changed within the predetermined time since start of reverse rotation of the tap 201 (step S213) and when there is no change, breakage of the tap 201 is detected (step S214) and emergency stop is performed (step 15). That is, in the case where breakage occurs when the tap 201 is pulled out from the work W, the front end of the tap 201 abuts on the projecting part 235 of the operator 227, the elastic member 231 prevents the operator 227 from ascending and the circumferential groove 243 of the operator 227 and the air port 245 of the outer sleeve 225 are kept to be connected with each other. Accordingly, the pressure sensor 253 remains in the OFF state and breakage of the tap 201 can be detected. Similarly, faulty behavior that the operator 227 does not return to the original position can be detected.

In the case where there is no breakage in the tap 201, when the tap 201 ascends, the operator 227 is moved up by action of the elastic member 231, connection of the circumferential groove 243 of the operator 227 and the air port 245 of the outer sleeve 225 is cut, pressure in the communicating path (connection path) 251 is increased and the pressure sensor 253 is brought into the ON state.

Therefore, when it is detected that the pressure sensor 253 is brought into the ON state (step S216), it is determined as normal and operation is continued (step S217) and then reverse rotation of the tap 201 is stopped (step S218), thereby to return to the initial state.

As understood, since the sensor state monitoring means 263 monitors the state of the pressure sensor 253 when the pressure sensor 253 changes from the ON state to the OFF state, failure of the sensor, if occurs, can be detected.

The communicating hole 247 provided at the operator 227 is communicated with space in which the elastic member 231 is installed in the above-mentioned configuration, and as shown by imaginary lines in FIG. 3, it is preferred that the communicating hole 247 is communicated toward the lower part of the discharge hole 239 of the cylindrical part 237.

As described above, by forming the communicating hole 247 so as to be inclined toward the lower part of the discharge hole 239 of the cylindrical part 237, when the operator 227 is lowered by being pressed by the front end of the tap 201 and the circumferential groove 243 is communicated with the air port 245, air is ejected from the communicating hole 247 toward the lower part of the discharge hole 239. Accordingly, negative pressure occurs in the lower part of the discharge hole 239 and outside air is sucked from the communicating path 241 provided at the projecting part 235. Thus, chips generated during tapping process by using the tap 201 are sucked from the communicating path 241 and then discharged through the discharge hole 239.

As understood, the discharge hole 239 of the cylindrical part 237 functions as discharging chips and the like and the communicating hole 247 constitutes an air exhaust hole for ejecting air toward the lower part of the discharge hole 239. Since air ejecting from the air exhaust hole into the discharge hole 239 serves to suck outside air from the communicating path 241, discharge of chips generated during tapping process can be performed effectively.

Next, with reference to FIGS. 7 to 10, another embodiment of the tap die of the present invention will be described. Concerning the same components as those in the tap die 5 described with reference to FIG. 3, 300 are added to reference numerals in FIG. 3 and the added reference numerals are given in FIGS. 7 to 10. Due to duplication, description of the same configuration is not repeated and configuration based on difference between them will be described.

In the tap die 5, when the operator 27 is lowered, space is generated between the lower face (back face) of the work supporting part 23 of the outer sleeve 25 and the upper face of the operator 27. However, since no compressed air flows into this space, there may be cases where offcuts (scraps) generated during tapping process enter into the space and the operator cannot completely ascend and return to the original position. For this reason, this embodiment intends to provide the configuration in which compressed air can flow into the space. Referring the figures, the improved configuration of the present invention will be described below.

As shown in FIGS. 7 to 10, an annular groove 343 is formed at an upper part of the inner circumference of an outer sleeve 325 of a tap die 300 in this embodiment. An air port 345 is formed so as to pass through the outer sleeve 325 in the horizontal direction and a vertically-extended vertical groove 371 which connects the groove 343 to the air port 345 is formed.

Like the tap die 5, an operator 327 which can freely slide in the vertical direction is provided in the outer sleeve 325. Therefore, when the tap 1 descends, thereby to press the operator 327 downwards, space is generated between an inner wall part of the outer sleeve 325 (a wall face corresponding to the lower face (back face) of the work supporting part 23 shown in FIG. 3) and the upper face of the operator 327. Air flows into the space through the air port 345, the vertical groove 371 and the groove 343.

Figure 10:
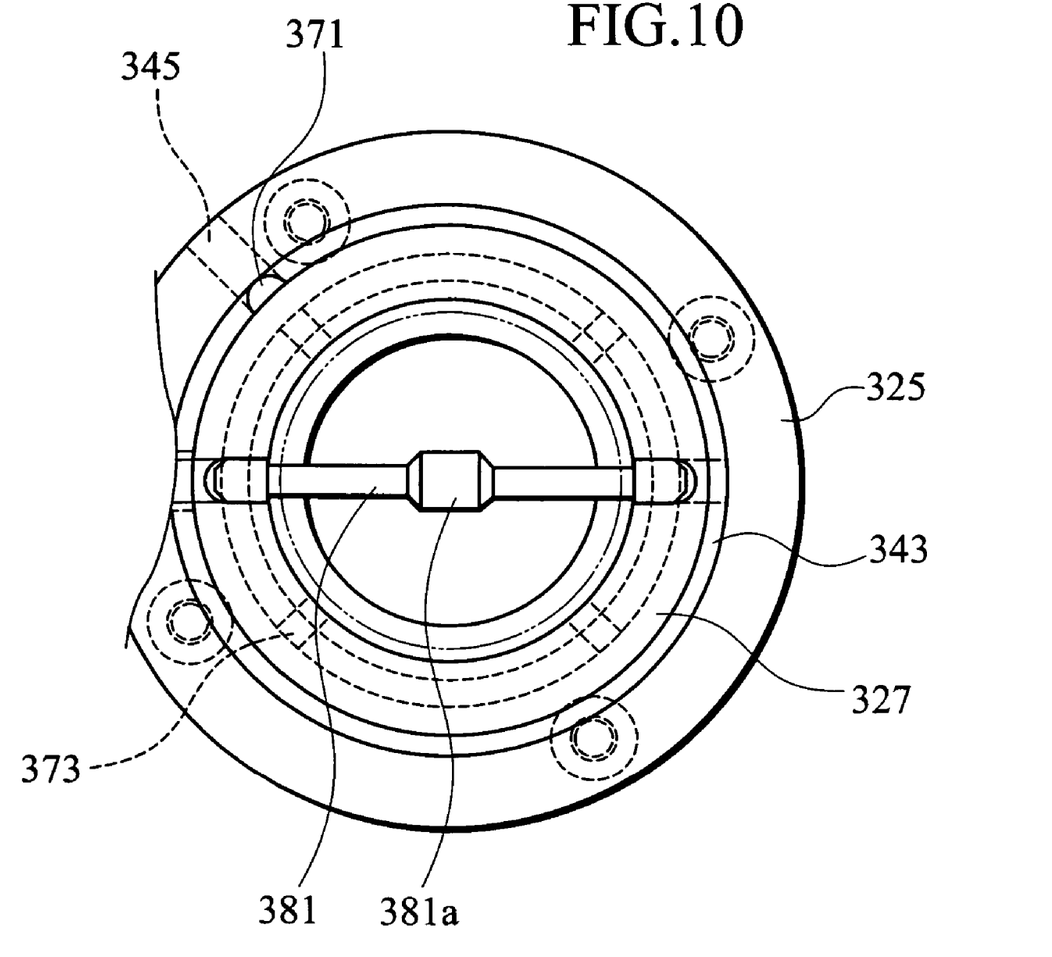
FIG. 10 is a sagittal sectional view taken along X-X in FIG. 8.

On the other hand, as shown in FIG. 10, a bar-like dog 381 is engaged with the operator 327. The dog 381 is engaged so as to run across a cylindrical wall of the operator 327. Accordingly, air can be passed through the space located on both sides of the dog 381, that is, the space other than the dog 381 and the cylindrical wall of the operator 327, in the vertical direction. A tap receiver 381a protruding upwards is formed at the center of the dog 381.

With the above-mentioned configuration, when the tap 1 descends and abuts on the tap receiver 381a, the operator 327 is pressed down downwards. Thus, space is generated between the inner wall part of the outer sleeve 325 (the wall face corresponding to the lower face (back face) of the work supporting part 23 shown in FIG. 3) and the upper face of the operator 327. Air flows into the space through the air port 345, the vertical groove 371 and the groove 343. Since the air flows into the space, the offcuts (scraps) accumulated on upper faces of the operator 327 moved downwards and the dog 381 are blew away and the upper faces of the operator 327 and the dog 381 become clean. For this reason, when the tap 1 completes descending and ascends, the upper face of the operator 327 adheres closely to the inner wall part of the outer sleeve 325 and can ascend and return to the original position.

Figure 7:
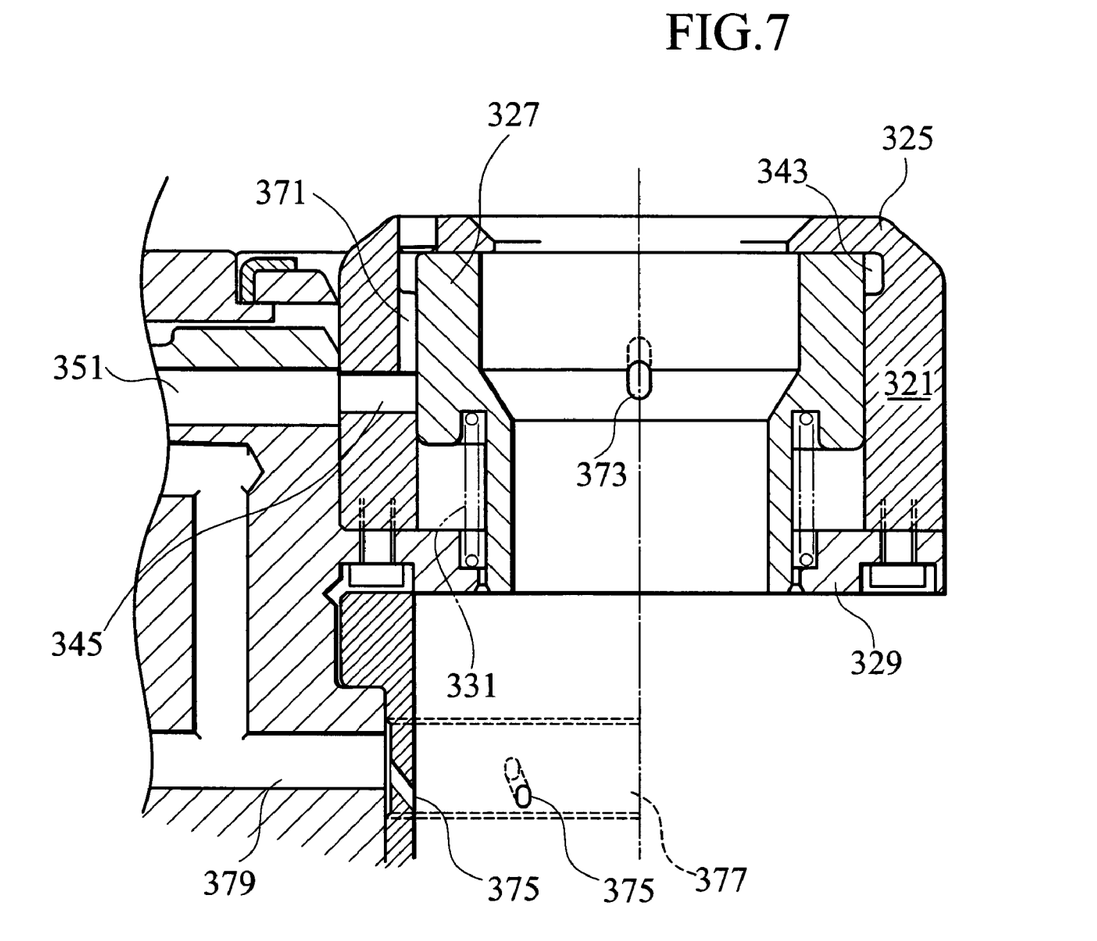
FIG. 7 is a sectional view of the tapping processing device for detecting breakage of the tap.
Figure 8:
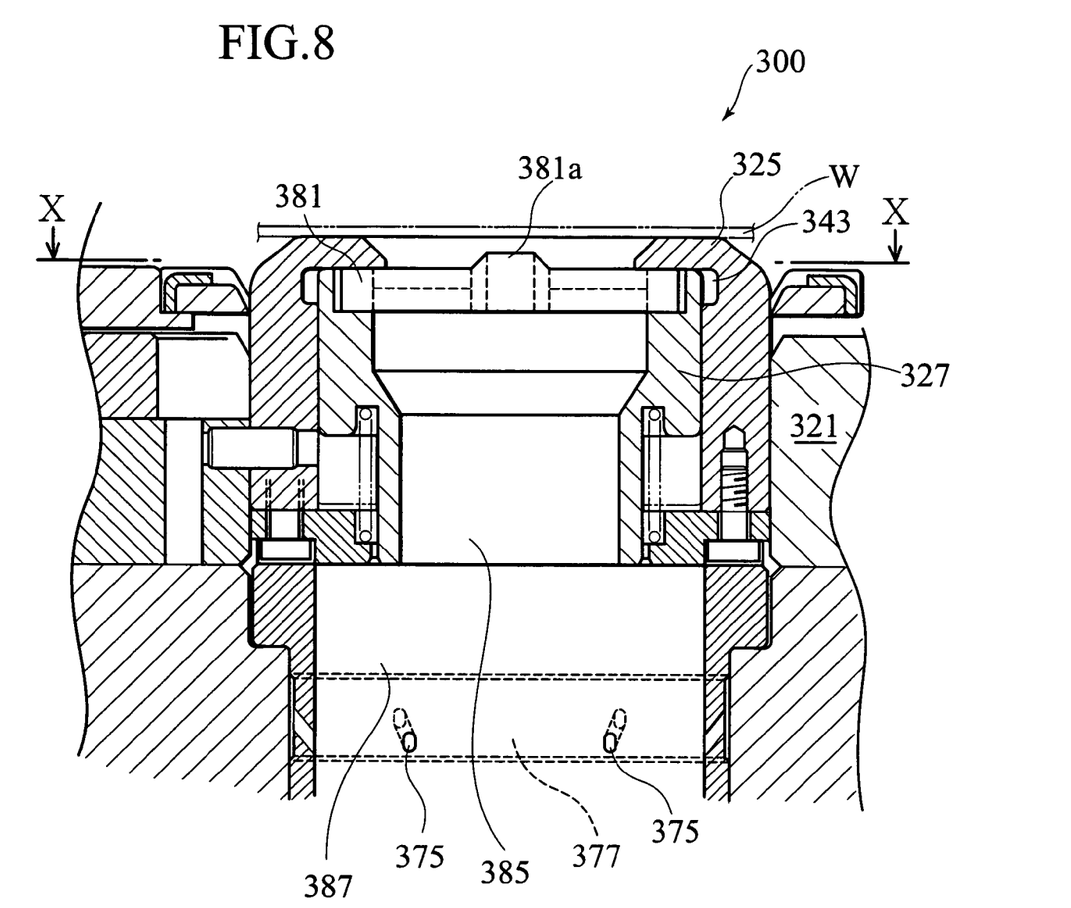
FIG. 8 is a sectional view of the tapping processing device for detecting breakage of the tap.
Figure 9:
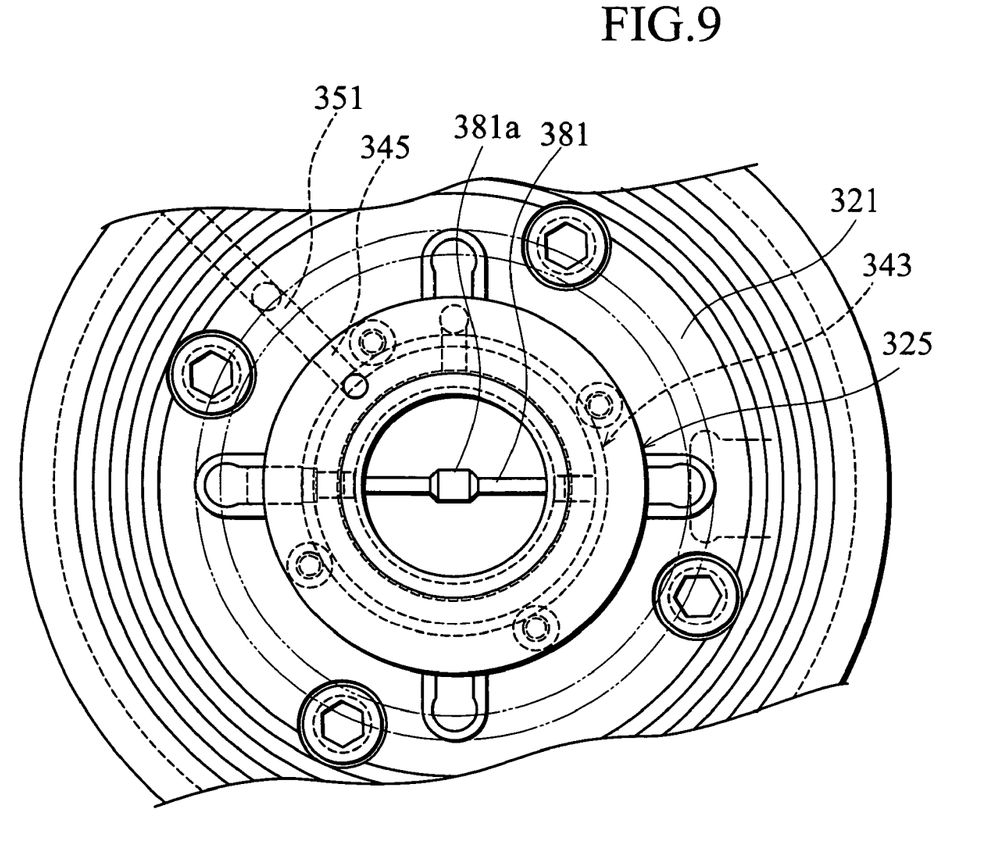
FIG. 9 is a plan view of the tapping processing device for detecting breakage of the tap.

As shown in FIG. 7 and FIG. 8, the outer sleeve 325 extends downwards. A plurality of through holes 375 for taking air thereinto are formed at appropriate places of the sleeve extending downwards. The through holes 375 are formed so as to be inclined downwards as they proceed to the inner side. The plural through holes 375 are communicated with each other through a circumferential groove 377.

Air formed in the lower holder 221 (FIG. 3) is compressed in a channel 379, the compressed air flows into all of the plural through holes through the circumferential groove 377, and the air further flows into a lower space 387 of the outer sleeve 325.

Since air flows into the lower space 387 and the air is ejected downwards, periphery of an upper space 385 of the outer sleeve 325 is brought into the state under negative pressure close to vacuum. Due to the state under negative pressure, the offcuts (scraps) accumulated on upper faces of the operator 327 and the dog 381 and blew away are sucked downwards, thereby to improve the effect of removing the offcuts (scraps).

Entire contents of Japanese Patent Application No. 2002-312811 (filed on Oct. 28, 2002) and Japanese Patent Application No. 2003-039705 (filed on Feb. 18, 2003) are incorporated into the description by reference.

The present invention is not limited to the above-mentioned embodiments and can be executed in the other mode with appropriate modifications.

The invention claimed is:

1. A tapping device, comprising:
 a tap holder, provided in a vertically movable shank body which can be freely attached to a rotating mold indexing device rotatably provided at a punch press, the tap holder having a tap at a lower end and being provided so as to be movable in a vertical direction and urged upwards;

a downward movement transmitter which receives and transmits a downward motion of a ram provided at the punch press so as to be movable in the vertical direction to the tap holder, the downward movement transmitter being at an upper part of the shank body, and the downward motion of the ram, which is received by the downward movement transmitter, is transmitted to the upper part of the shank body; and an elastic member positioned within a space provided in the shank body, the elastic member extending between a bottom of the space and an upper end of the tap holder so as to urge the tap holder upwards.

2. A tapping device according to claim 1, wherein a workpiece brace is rotatably provided at a lower end of the shank body.

3. A tapping device according to claim 2, wherein an oil channel for guiding oil supplied from the ram to the tap is provided in the downward movement transmitter and the tap holder.

4. A tapping device, comprising:

a tap holder provided in a vertically movable shank body which can be freely attached to a rotating mold indexing device rotatably provided at a punch press, the tap holder having a tap at a lower end and being provided so as to be movable in a vertical direction and urged upwards;

a downward movement transmitter which receives and transmits a downward motion of a ram provided at the punch press so as to be movable in the vertical direction to the tap holder, wherein the downward motion of the ram, which is received by the downward movement transmitter, is transmitted to the upper part of the shank body and, wherein the downward movement transmitter has a pressing device which presses the tap holder downwards by fluid pressure supplied from the ram and a shock absorber; and an elastic member positioned within a space provided in the shank body, the elastic member extending between a bottom of the space and an upper end of the tap holder so as to urge the tap holder upwards.

5. A tapping device according to claim 4, wherein a workpiece brace is rotatably provided at a lower end of the shank body.

6. A tapping device according to claim 5, wherein an oil channel for guiding oil supplied from the ram to the tap is provided in the downward movement transmitter and the tap holder.

* * * * *